July 5, 1932. W. A. ROSS 1,866,131
DRILL CONTROLLING APPARATUS
Original Filed Feb. 11, 1927 4 Sheets-Sheet 1

Inventor
Warren A. Ross
by Parker Carter
Attorneys.

July 5, 1932.  W. A. ROSS  1,866,131

DRILL CONTROLLING APPARATUS

Original Filed Feb. 11, 1927   4 Sheets-Sheet 3

Inventor
Warren A. Ross
by Parker & Carter
Attorneys.

July 5, 1932.  W. A. ROSS  1,866,131
DRILL CONTROLLING APPARATUS
Original Filed Feb. 11, 1927  4 Sheets-Sheet 4
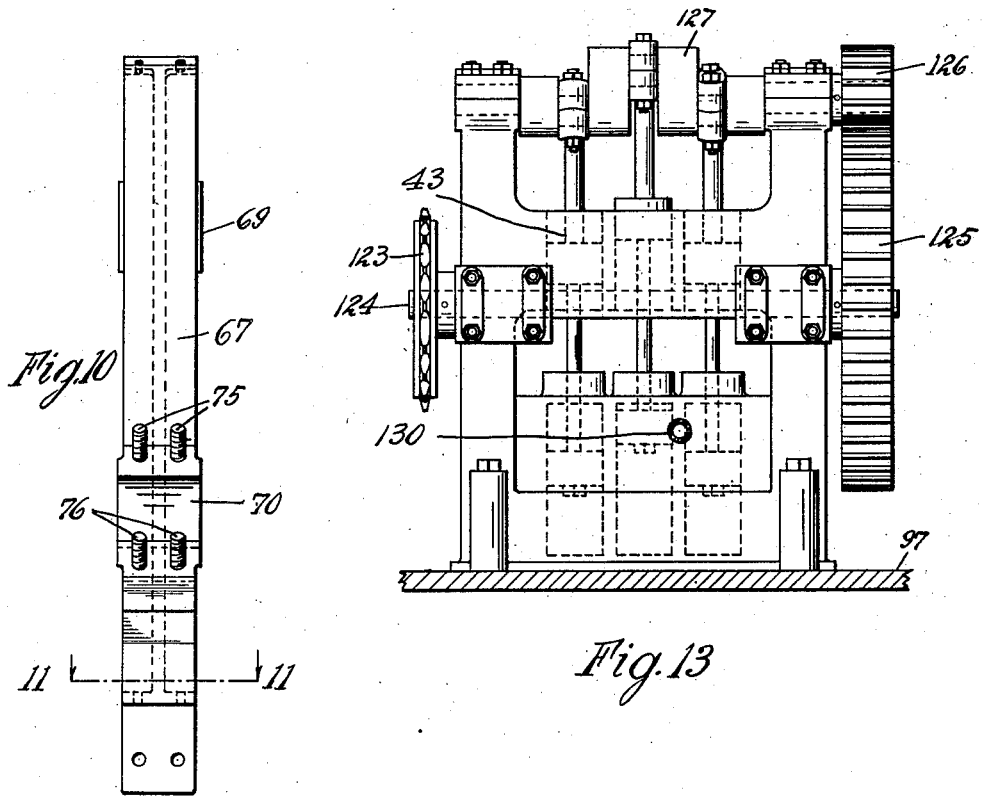
Fig.10
Fig.13
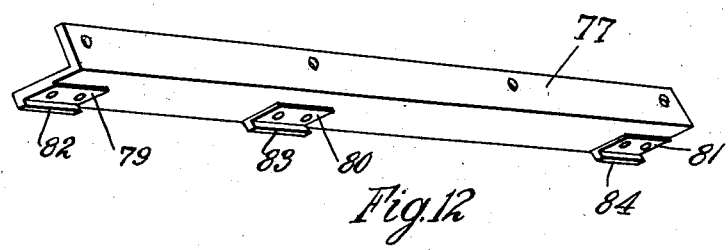
Fig.12
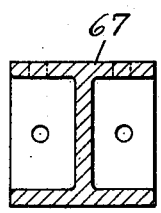
Fig.11
Inventor
Warren A. Ross
by Parker & Carter
Attorneys.

Patented July 5, 1932

1,866,131

UNITED STATES PATENT OFFICE

WARREN A. ROSS, OF LONG BEACH, CALIFORNIA, ASSIGNOR OF ONE-FOURTH TO TRUMAN O. BOYD, OF LONG BEACH, CALIFORNIA, AND ONE-FOURTH TO DONALD M. CARTER, OF CHICAGO, ILLINOIS

DRILL CONTROLLING APPARATUS

Application filed February 11, 1927, Serial No. 167,567. Renewed December 7, 1931.

This invention relates to drill controlling apparatus and has for its object to provide a new and improved apparatus of this description.

The invention has as a further object to provide a drill controlling apparatus which will permit the operator to accurately control the pressure on the cutters.

The invention has as a further object to provide a new and improved construction for supporting the shafts and the operative connections between such shafts and the other parts of the apparatus.

The invention has other objects which are more particularly pointed out in the accompanying description.

Referring now to the drawings, Fig. 1 is a side elevation showing a derrick and the controlling apparatus in position, when used for drilling oil wells.

Fig. 3 is a sectional view taken on line 3—3 of Fig. 2.

Fig. 10 is a view of one of the bearing supporting members of the frame shown in Fig. 2.

Fig. 11 is an enlarged sectional view taken on line 11—11 of Fig. 10.

Fig. 12 is a perspective view of one of the horizontal frame members of the frame illustrated in Fig. 2.

Fig. 13 is a view showing one form of pump employed in the controlling apparatus.

Like numerals refer to like parts throughout the several figures.

Figure 1:
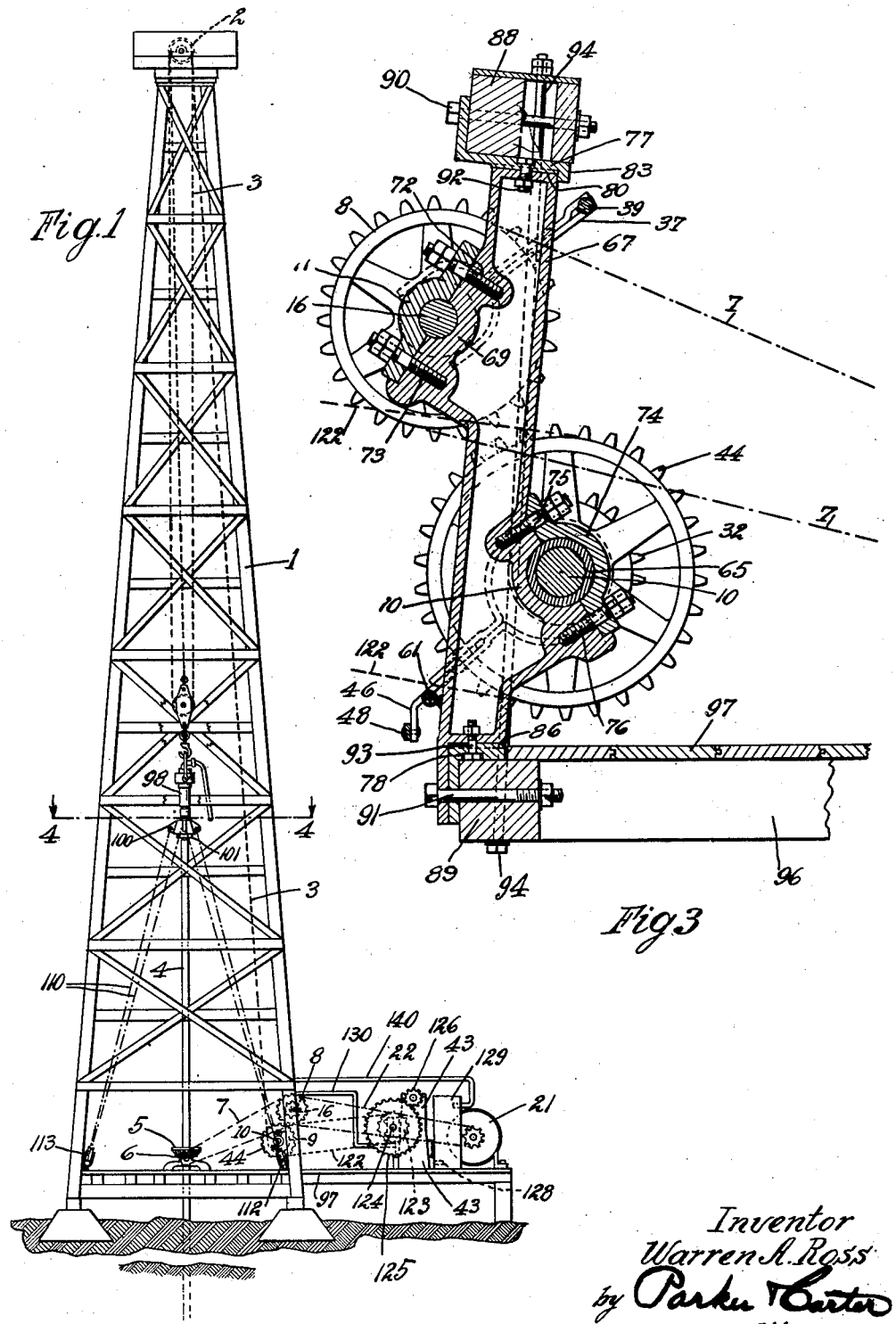

Referring now to the drawings, I have shown in Fig. 1, a derrick 1 with one or more pulleys 2 at the top over which passes the cable 3 which is connected through the agency of a suitable mechanism, with the drill pipe which extends into the hole being drilled, such mechanism including the sliding, rotatable, driving member or part 4 which is directly connected to the drill pipe. The part 4 slides through the rotatable part 5 so as to be rotated when the part 5 is rotated thereby rotating the drill pipe. The part 5 is rotated in any desired manner and is herein shown as provided with teeth which are engaged by a pinion on a shaft 6, said shaft being driven by a belt 7 on the sprocket 8. The cable 3 is wound upon a drum 9 keyed to the shaft 10, (see Fig. 2). This drum is provided with the brake wheels 11 and 12 and the brake bands 13, 14 controlled by the lever 15.

The drum 9 is driven from the shaft 16 by means of a sprocket 17, belt 18 and sprocket 19, said sprocket 19 being loosely mounted on the shaft 10. The shaft 16 is driven from any suitable source of power by means of the sprocket wheel 20.

As shown in Fig. 1, the motor 21 is connected with the sprocket wheel 20 by means of the belt 22. The driving connection from the sprocket wheel 17 drives the drum at a low speed. This drum is driven by the motor in raising or lowering the drill pipe and the cutting tool in the hole.

When it is desired to drive the drum at the low speed, the clutch member 23, which is feathered to the shaft 10, is moved by means of the lever 23a, into engagement with the clutch member 24 on the sprocket wheel 19, thus connecting the sprocket wheel with the shaft so as to drive said drum. The drum is driven at its high speed by means of the sprocket wheel 25 on the shaft 16 which is connected by the belt 26 with a sprocket wheel 27 loosely mounted on the shaft 10.

A clutch member 28, feathered to the shaft 10, is moved by the lever 28a, into engagement with the clutch member 29 on the sprocket wheel 27 when it is desired to have said sprocket wheel drive said drum. The drum is driven at an intermediate speed by means of the sprocket wheel 30 on the shaft 16 which is connected by a belt 31 with a sprocket wheel 32, loosely mounted on the shaft 10. The sprocket wheel 32 is connected with the shaft 10 by the clutch member 33 so as to drive the drum 9 feathered to said shaft. This clutch member, when moved in the proper direction, engages a clutch member 34 on the sprocket wheel 32.

The various clutch members, by means of which the drum is connected with the driving shaft to drive it at various speeds, are arranged so that they are automatically drawn out of engagement with their opposed clutch members when the shaft 10 is driven at a higher speed than it is driven through such clutch members, that is, if the intermediate speed is being used, the clutch member 23 of the low speed will be automatically thrown out and if the high speed is being used, the clutch members 33 and 23 will both be thrown out.

The rotating part 5 is rotated by means of the sprocket wheel 8 loosely mounted on the shaft 16, which, as shown in Fig. 1, is connected by the belt 7 with the shaft 6. When it is desired to drive the part 5, the sprocket wheel 8 is connected to the shaft 16 by moving the clutch member 35 which is feathered on said shaft so as to cause it to engage the clutch member 36 connected with the sprocket wheel 8. The clutch member 35 is moved by means of the lever 37 pivoted at 38, said lever being connected with the part 39. The part 39 is connected to a shaft 40 by means of a crank 41. The shaft 40 is operated by a handle 42.

Means is provided for connecting the shaft 10 with a pump 43, (see Figs. 1 and 13), and for disconnecting said shaft from said pump. In the construction shown, this is accomplished by means of a sprocket wheel 44 loosely connected on the shaft 10 and which is connected with said shaft by the clutch member 33 which engages a clutch member 45 on the sprocket wheel. It will be noted that the said clutch member 33 is used to connect the shaft 10 and drum with the driving shaft 16 for the intermediate speed as is used to connect the shaft 10 and drum with the pump. This economizes space and prevents the two connections from being made simultaneously.

Some means is provided for preventing the clutch member 33 from being connected with the wrong opposed clutch member 34 or 45. This is accomplished by the following mechanism.

The clutch member 33 is actuated by the lever 46 pivoted at 47. This lever is connected with the connecting piece 48 which extends to the other end of the frame which is connected with a crank 49 on the shaft 50. Connected with the shaft 50 is a hub 51 of the foot lever 52. When this foot lever is pressed downwardly it moves the shaft 50 so as to move the crank 49 to the left, (see Fig. 2) and this moves the clutch member 33 into engagement with the clutch member 34 connecting the drum with the driving shaft 16.

Figure 7:
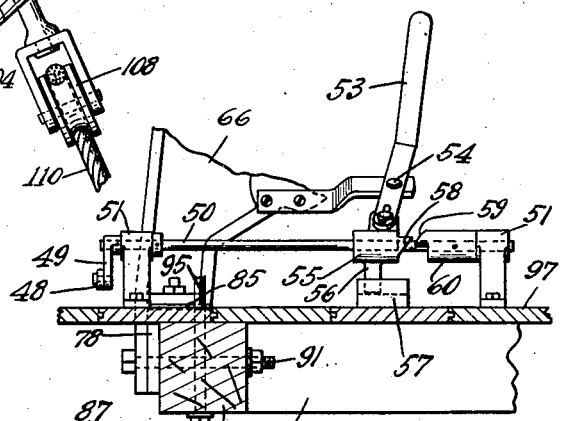
Fig. 7 is a sectional view taken on line 7—7 of Fig. 2.

When it is desired to move the clutch member 33 into engagement with the clutch member 45, a hand lever 53 is used. This hand lever is pivoted at 54 (see Figs. 2 and 7) and is connected with a sleeve 55 sliding loosely on the shaft 50. This sleeve has a projection 56 which works in a guide in a stationary member 57 which prevents the sleeve from rotating but permits the shaft to rotate in the sleeve. The sleeve 55 is provided with the beveled face 58 which engages the beveled face 59 on a member 60 connected with the shaft 50 so as to rotate therewith. When the lever 53 is moved to bring these beveled faces into engagement, the beveled face 58 slides along the beveled face 59 and causes the shaft 50 to rotate in the opposite direction, that is, so as to move the crank 49 (see Fig. 2), to the right. This moves the clutch member 33 into engagement with the clutch member 45.

The clutch member 33 is moved to its central or inoperative position by the springs 61 and 62 when the foot lever 52 and the hand lever 53 are released.

In order that the frame supporting the shafts 10 and 11 shall not be unduly extended because of the numerous sprocket wheels associated therewith, and particularly with the shaft 10, I arrange the sprocket wheel 44 with a hub 65 which projects into the bearing. This gives an extended hub for the sprocket wheel 44, without lengthening the frame. This extended hub is necessary to hold the sprocket wheel in its proper position when it is connected with the pump.

The shafts 16 and 10 are mounted in bearings in a frame which frame is usually assembled in the field at the point of use.

In the construction heretofore used, the frame has been made of wood and there has been great difficulty in getting the bearings in proper alignment so that the two shafts will be parallel as the tightening up of screws in wood tends to move the parts out of alignment.

The construction herein shown is arranged to remedy this evil. The bearings for the shafts are located on the upright members 66, 67 and 68 of the frame. These members are made of metal, preferably of an I beam cross section as shown in Fig. 11 so as to make them light but still strong and durable. Each member has two bearings preferably arranged on opposite sides thereof, as shown in Fig. 3. This figure shows the central member 67. Integral with the member 67 is a bearing element 69 for the shaft 16 and a bearing element 70 for the shaft 10. These bearing elements are, therefore, in fixed positions with relation to each other. The shaft 16 is held in place by a removable cap 71 which is held in position by screws 72 and 73. The shaft 10 is held in place by a removable cap 74 held in position by screws 75 and 76. Since these screws work in threaded holes in the metal, there can be no drawing of the parts out of alignment when they are tightened.

Figure 2:
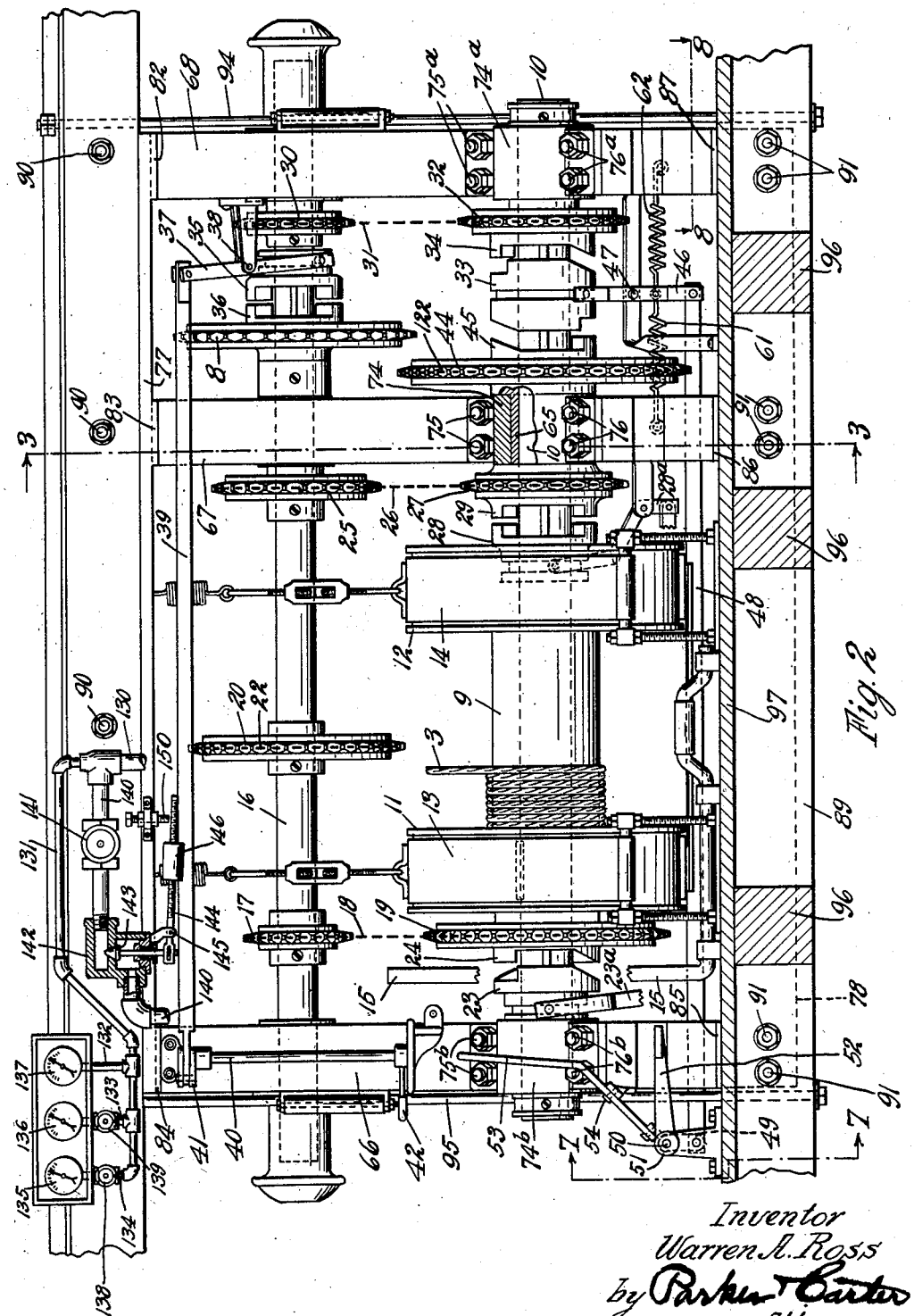
Fig. 2 is a front elevation showing the shafts and shaft supporting frame and associated parts.
Figure 9:
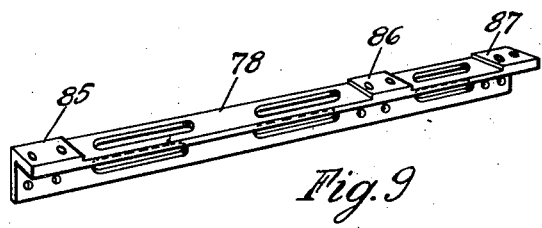
Fig. 9 is a perspective view of one of the frame pieces of the frame shown in Fig. 2.

The other members 66 and 68 are similarly constructed and have similar bearing elements. The parts thereof which show in Fig. 2 have applied thereto, similar reference numerals with the exponents "a" and "b". Some means is provided for properly aligning the several bearings on the several members 66, 67 and 68, so that when the parts are assembled in the field, these bearings will always be in proper position. As herein shown, this is accomplished by the top and bottom aligning members 77 and 78. The top aligning member 77 is shown separately in Fig. 12 and the bottom aligning member 78 is shown separately in Fig. 9. These members may have portions of the metal omitted in order to lighten the construction. These members are also preferably cast and extend along the top and bottom of the members 66, 67, and 68 and are provided with projections where they are engaged by the members 66, 67 and 68 which projections may be planed off in the shop so that the bearings on all of the members 66, 67 and 68 will be in proper alignment. As herein shown the aligning member 77 is provided with projections 79, 80 and 81 which may be finished or planed, as above set out. I prefer to provide the upper aligning member 77 with flanges 82, 83 and 84 which overlap the edges of the members 66, 67 and 68 as shown in Fig. 3. The bottom aligning member 78 is provided with the projections 85, 86 and 87 which are planed off to secure the proper alignment of the shafts. In assembling the parts, the aligning members 77 and 78 are connected with the top and bottom beams 88 and 89, by means of bolts 90, 91, the bolts 91 also passing through the members 66, 67 and 68. The aligning member 77 is connected with the members 66, 67 and 68 by the bolts 92 and the aligning member 78 is connected with the members 66, 67 and 68, by the bolts 93. The beams 88 and 89 are connected together by the rods 94 and 95. A floor for the operator is also provided by means of the beams 96, the floor 97 being supported upon said beams and the beams 89, as shown in Figs. 2 and 3.

It will be seen that by means of this construction, the parts may be completely aligned in the shop and that when set up in the field, complete alignment of the bearings of the shafts is assured.

Figure 5:
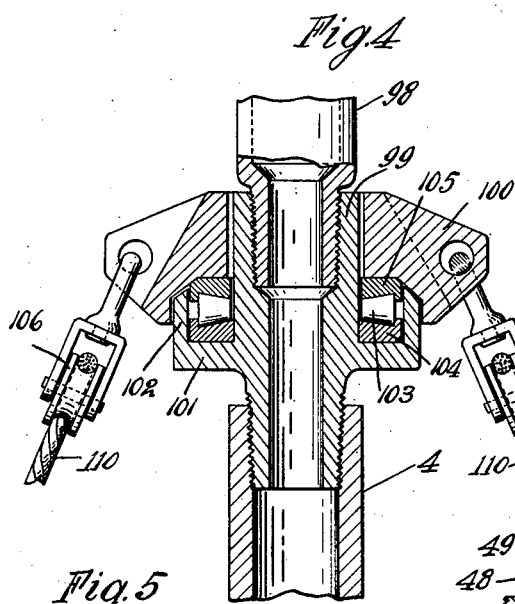
Fig. 5 is a sectional view taken on line 5—5 of Fig. 4, with parts omitted.
Figure 8:
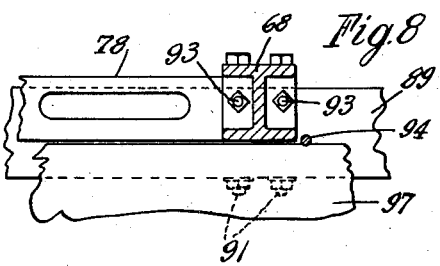
Fig. 8 is a sectional view taken on line 8—8 of Fig. 2.

It will further be seen that this construction provides a strong, durable "draw works," which can be easily taken down to be moved from place to place and easily and quickly assembled at the point of use. In starting the drill, some means must be provided for securing the proper pressure upon the cutting device as the weight of the parts is not sufficient for this purpose. In the drawings, I have illustrated one means for accomplishing this. In this construction, I insert a pressure device between the water swivel 98 and the driving member 4. This pressure device consists of a hollow member 99 (see Fig. 5). One end of this hollow member is attached to the water swivel 98, and the other end to the driving member 4. This hollow member 99 permits the free flow of the water to the drill pipe. Mounted upon the hollow member 99 is a pressure applying member 100, the members 99 and 100 being relatively rotatable.

I prefer to provide roller bearings between them. As herein shown, the hollow member 99 is provided with a laterally projecting part 101 and the upstanding outer wall 102, thus providing a recess for the roller bearings 103. These bearings work in between the hardened member 104 connected with the part 99 and the hardened member 105 connected with the part 100. The part 99 is preferably connected with the water swivel 98 and the driving member 4 by screw threaded connections as shown. Some means is provided for applying pressure to the pressure member 100.

In the construction shown, the pressure member is provided with a plurality of holes which receive the hooks of a series of pulleys.

Figure 4:
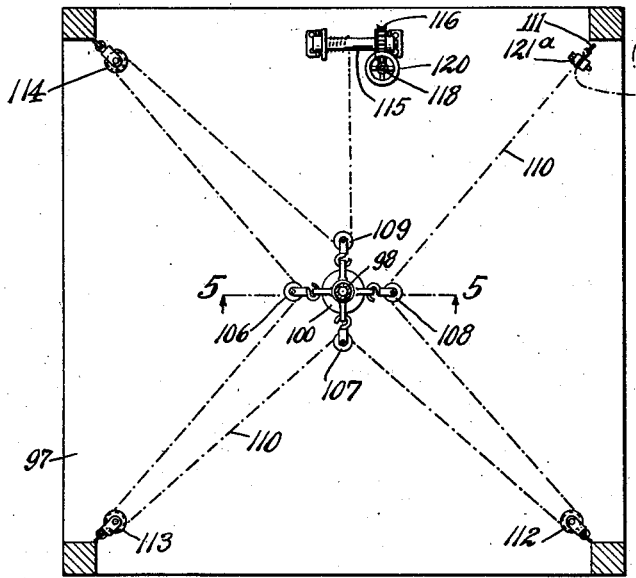
Fig. 4 is an enlarged sectional view taken on line 4—4 of Fig. 1, with parts omitted.
Figure 6:
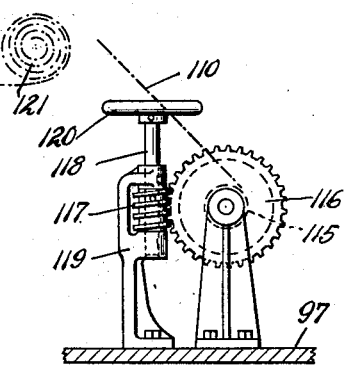
Fig. 6 is an end elevation of the cable drum, and associated parts shown in Fig. 4.

In the drawings, I have shown four such pulleys, 106, 107, 108 and 109. A cable 110 is connected at 111 with a fixed part and then passes around these pulleys and around the pulleys 112, 113 and 114 attached to fixed parts, and then passes to the drum 115 as clearly shown in Fig. 4.

It will be seen that by winding the cable up on this drum, pressure will be easily applied to the pressure member for forcing the cutting device against the material to be cut. This drum may be operated in any desired manner. As herein shown, the worm wheel is connected with the drum and is rotated by means of a worm 117. On the shaft 118 mounted in the support 119. The shaft 118 may be operated in any desired manner and for purposes of illustration, I have shown a hand wheel 120.

By rotating the shaft 118 so as to wind the cable on the drum, any desired pressure can be secured. The worm and worm wheel acts as a lock to prevent backward movement of the drum. The cable may be arranged of the maximum length in order to prevent too much of the cable being wound on the drum 115 as the parts are forced downwardly. The unnecessary part of the cable may be formed into a coil 121. When the coil is used, the cable is bent so as to have two parallel portions which are clamped together by the clamp 121a.

It will be seen that by this arrangement, any desired pressure may be applied to the cutting device at the beginning and upper portion of the hole and until the weight of the parts is sufficient to supply the necessary pressure. It will further be seen that by means of this device, there is no interference with the drilling or the rotation of the parts and that the device in no manner limits the length of the cut which can be made before it is necessary to insert a new length of drill pipe.

After the hole becomes deep enough so that the weight of the parts is sufficient or more than sufficient to supply the desired pressure upon the cutting device, the pressure device is removed or rendered inoperative and the pressure on the cutting device is regulated automatically. For this purpose, the clutch 33 is moved to connect the shaft 10 with the sprocket wheel 44. The weight of the drill pipe and associated parts is then applied to the sprocket wheel through the cable 3, the drum 9 and the shaft 10.

The sprocket wheel 44 is connected by a belt 122 with a sprocket wheel 123 on a shaft 124 of the pump 43, (see Figs. 1 and 13). Any suitable form of pump may be used and I have illustrated one form in Fig. 13 wherein the shaft 124 is provided with a gear wheel 125 which engages the pinion 126 on the crank shaft 127 which operates the pistons of the pump. The pump is connected by a pipe 128 with a tank 129 containing a suitable liquid such as water. The pump, when operated, pumps water from the tank 29 into a pipe 130, (see Figs. 1 and 2). Connected with the pipe 130 is a pipe 131. Separate pipes 132, 133 and 134 lead from pipe 131 to the indicating devices 135, 136 and 137. The pipe 134 is provided with a control valve 138 and the pipe 133 with a control valve 139. Leading from the pipe 130 is a return pipe 140 provided with a hand control valve 141 and an automatic control valve device 142. This control valve device is provided with a valve 143 which controls the return of the liquid through the return pipe. The valve stem of the valve 143 is connected with a lever 144 pivoted at 145 and provided with an adjustable weight 146. The return pipe 140 leads back to the tank 129.

In the use of this part of the device, the drill pipe and tool are lowered into the hole, the weight thereof rotating the drum 9 and this rotates the sprocket wheel 44 and actuates the pump 43. This pump forces the liquid into the pipes 130 and 131 and to the indicating devices. Just before the cutting device engages the bottom of the hole, the pressure will be a maximum as it will register the entire weight of the drill pipe and associated parts. The valve 138 may now be closed so as to trap this pressure in the indicating device and the needle on the indicating device will remain at the point indicating this weight. The drill pipe and cutting device are then lowered until the cutting device engages the bottom of the hole and this lowering is continued until the desired weight for drilling is pressed upon the cutting device.

The valve 141 is open enough to release the pressure sufficiently to permit this lowering. When the proper weight of the parts is on the cutting device, the indicating devices 136 and 137 will register less than the indicating device 135 by the amount of weight resting on the cutting device, and if this amount should be, say five thousand pounds, there will be that difference in the registration on the indicating device 135 and the indicating devices 136 and 137. The indicating device 136, it will be seen directly indicates the weight of the drill pipe which it is desired to remove from the cutting device while it is being operated. The valve 139 is now closed so as to trap this pressure in the indicating device 136 and the needle on said indicating device will remain where it was when the valve was closed. The two indicating devices, 135 and 136 will, therefore, show a difference in registration equal to the weight placed upon the drill.

The valve 143 is set by means of the weight 146 so as to open when the pressure in the pipe increases above that indicated by the indicating device 136, thus maintaining the pressure at the proper amount, that is, at the proper amount to maintain the desired pressure on the cutting device.

The indicating device 137 indicates the variation of pressure on the cutting device and the valve 143 is adjusted as necessary when such a variation occurs to bring the pressure back to the desired amount. In operating the device, therefore, the needle of the indicating device 137 should be kept at the same point as the needle of the indicating device 136. This device therefore indicates the total weight of the cutting tool and drill pipe by means of the indicating device 135 and the portion of the weight that it is desired to remove from the cutting device while it is acting on the material to be cut, by the indicating device 136 and the portion of the weight actually removed from the cutting device, at any given time and the variation thereof. The liquid that passes the valves 141 and 143 goes back through the return pipe 140 to the tank 129.

It sometimes happens that the cutting device strikes a soft material or a cavity a .d in this event, unless some means is provided to prevent it, the cutting device will move too rapidly. In the construction shown, this is prevented by means of the set screw 150 which is arranged to engage the lever 144 or some part associated therewith so as to prevent the valve 143 from being completely opened when the pressure in the system is increased rapidly as would be the case under the above named conditions.

I claim:

1. A drill controlling apparatus comprising a circulatory system, a fluid moving device for circulating fluid through said system and actuated by weight of the drill pipe as the drill is fed to the material to be acted upon, a pressure gauge including an indicating part actuated by said fluid, a pipe connecting said pressure gauge with said circulatory system, a valve in said pipe to shut off said pressure gauge from said system after the indicating part has been actuated so as to maintain said actuating part in a predetermined position, a second pressure gauge, a pipe connecting said second pressure gauge with said circulatory system and a liquid controlling device forming a part of said circulatory system for controlling said liquid so as to maintain the indicating part of said latter indicating device in substantially the same position as the indicating part of the first mentioned indicating device when the drill is in operation.

2. A drill controlling apparatus comprising a circulatory system, a fluid moving device for circulating fluid through said system and actuated by weight of the drill pipe as the drill is fed to the material to be acted upon, a pressure gauge including an indicating part actuated by said fluid, a pipe connecting said pressure gauge with said circulatory system, a valve in said pipe to shut off said pressure gauge from said system after the indicating part has been actuated so as to maintain said actuating part in a predetermined position, a second pressure gauge, a pipe connecting said second pressure gauge with said circulatory system and a liquid controlling device forming a part of said circulatory system for controlling said liquid so as to maintain the indicating part of said latter indicating device in substantially the same position as the indicating part of the first mentioned indicating device when the drill is in operation, a support for said pressure gauges for supporting them in proximity to each other in the line of sight of the drill operator.

3. A drill controlling apparatus comprising a fluid circulation system, a pump therein, pressure indicating means in communication with said system comprising three indicators, means for fixedly recording the fluid pressure in either of two of said indicators when desired, and an adjustable automatic valve in said circulation system.

4. A drill controlling apparatus comprising a fluid circulation system, a pump therein, pressure indicating means for said system comprising three indicators, means for fixedly recording the fluid pressure in either of two of said indicators when desired, and means for maintaining the fluid pressure in the third indicator substantially the same as is fixedly recorded in one of the other two indicators.

5. A drill controlling apparatus comprising a fluid circulation system, a pump therein, pressure indicating means for said system comprising three indicators, means for fixedly recording the fluid pressure in either of two of said indicators when desired, and an adjustable valve in said circulation system.

Signed at Chicago, county of Cook and State of Illinois, this twenty second day of January, 1927.

WARREN A. ROSS.